United States Patent
Das Sharma

(10) Patent No.: US 10,162,770 B2
(45) Date of Patent: Dec. 25, 2018

(54) VIRTUAL MACHINE MIGRATION IN RACK SCALE SYSTEMS

(71) Applicant: Intel Corporation, Santa Clara, CA (US)

(72) Inventor: Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 363 days.

(21) Appl. No.: 15/198,536

(22) Filed: Jun. 30, 2016

(65) Prior Publication Data
US 2018/0004558 A1    Jan. 4, 2018

(51) Int. Cl.
*G06F 13/16* (2006.01)
*G06F 9/455* (2018.01)
*G06F 12/1081* (2016.01)

(52) U.S. Cl.
CPC ...... *G06F 13/1663* (2013.01); *G06F 9/45533* (2013.01); *G06F 12/1081* (2013.01); *G06F 2009/4557* (2013.01); *G06F 2009/45583* (2013.01); *G06F 2212/656* (2013.01)

(58) Field of Classification Search
None
See application file for complete search history.

(56) References Cited

U.S. PATENT DOCUMENTS

| | | | | |
|---|---|---|---|---|
| 5,619,727 | A * | 4/1997 | Chen | G06F 13/28 710/107 |
| 9,197,489 | B1 * | 11/2015 | Vincent | H04L 67/148 |
| 2004/0093438 | A1 | 5/2004 | Odom | |
| 2007/0073924 | A1 | 3/2007 | Kuroki et al. | |
| 2008/0104591 | A1 | 5/2008 | McCrory et al. | |
| 2009/0006296 | A1 | 1/2009 | Chen et al. | |
| 2012/0180043 | A1 * | 7/2012 | Tsirkin | G06F 9/455 718/1 |
| 2012/0254866 | A1 * | 10/2012 | Iwamatsu | G06F 9/45558 718/1 |
| 2014/0344488 | A1 | 11/2014 | Flynn et al. | |

(Continued)

OTHER PUBLICATIONS

PCT Notification of Transmittal of the International Search Report and the Written Opinion of the International Searching Authority for PCT Application No. PCT/US2017035218, dated Aug. 25, 2017, 11 pages.

*Primary Examiner* — Elias Mamo
(74) *Attorney, Agent, or Firm* — Lowenstein Sandler LLP

(57) ABSTRACT

Virtual machine (VM) migration in rack scale systems is disclosed. A source shared memory controller (SMC) of implementations includes a direct memory access (DMA) move engine to establish a first virtual channel (VC) over a link with a destination SMC, the destination SMC coupled to a destination node hosting a VM that is migrated to the destination node from a source node coupled to the source SMC, and transmit, via the first VC to the destination SMC, units of data corresponding to the VM and directory state metadata associated with each unit of data. The source SMC includes a demand request component to establish a second VC over the link, receive, via the second VC from the destination SMC, a demand request for one of the units of data corresponding to the VM, and transmit, via the second VC, the requested unit of data and corresponding directory state metadata.

25 Claims, 9 Drawing Sheets

(56) References Cited

U.S. PATENT DOCUMENTS

| | | | |
|---|---|---|---|
| 2015/0052282 A1* | 2/2015 | Dong | G06F 13/32 710/308 |
| 2015/0186057 A1 | 7/2015 | Das Sharma et al. | |
| 2015/0186069 A1 | 7/2015 | Sharma et al. | |
| 2015/0186215 A1 | 7/2015 | Das Sharma et al. | |

* cited by examiner

VIRTUAL MACHINE MIGRATION IN RACK SCALE SYSTEMS

TECHNICAL FIELD

The embodiments of the disclosure relate generally to computing systems and in particular (but not exclusively) to virtual machine migration in rack scale systems.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DESCRIPTION OF EMBODIMENTS

Figure 1:
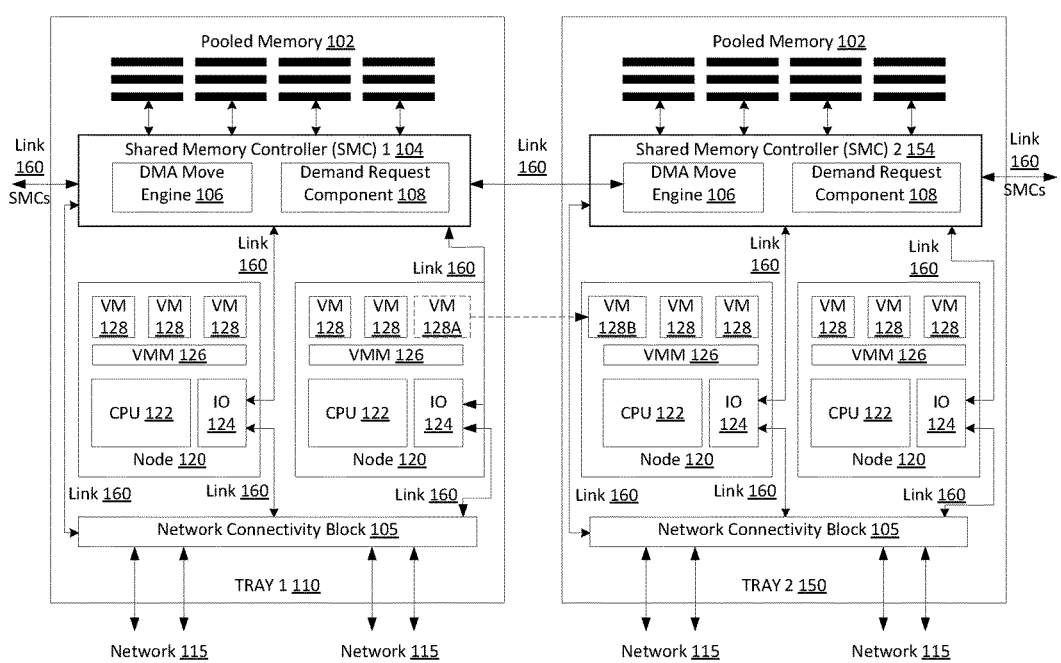
FIG. 1 illustrates a multi-node system, according to one embodiment.

Implementations of the disclosure describe techniques for virtual machine (VM) migration in rack scale systems. Implementations of the disclosure address memory migration of a VM when migrating the VM between nodes in a multi-node system, such as a rack scale system. More specifically, implementations of the disclosure redirect memory accesses from a new location of a migrated VM to an old location of the migrated VM, utilize a direct memory access (DMA) move engine (also referred to as "DMA engine") to transfer VM data using separate virtual channels, and enhance directory state bits to store a directory status of each cache line of the VM being migrated. Implementations of the disclosure may also be used to migrate memory for purposes other than virtualization, such as moving data sets from one node to another node.

When a VM is migrated from a source node to a destination node, the memory content associated with the VM may remain in its location under management of a source shared memory controller (SMC) or may be transferred to a proximate memory location under management of a destination shared memory controller (SMC). The memory content may be transferred to the destination SMC for proximity reasons (e.g., lower latency and less bandwidth demand, especially if crossing multiple SMCs for memory requests), for power savings reasons (e.g., powering down an entire tray after migrating the VMs and their contents to a different tray), or for lowering memory fragmentation (e.g., if implementing the redirection through range registers as those are fixed hardware resources).

When the memory content is to be transferred, implementations of the disclosure utilize a DMA move engine and a demand request component of an SMC to enable the migration of the VM to occur asynchronously along with the memory transfer of the VM (e.g., the memory transfer may occur subsequent to the VM migration). This asynchronous memory transfer may include a data move process and a demand request process. The DMA move engine manages the data move process by asynchronously copying data of a migrated VM from a source memory location (of the VM) managed by a source SMC to a destination memory location (of the VM) managed by a destination SMC. The demand request component manages received demand read requests issued to the destination SMC (for the migrated VM) and enables a seamless response to the demand read request while the data move process is occurring.

Conventional solutions for VM migration have drawbacks. For example, conventional system may stall the migrated VM's execution until after the memory migration completes. This may have negative performance and Quality of Service (QoS) implications. In addition, conventional systems may perform migrations using an input/output (I/O) protocol stack, such as transmission control protocol/internet protocol (TCP/IP) stack, which can be time consuming due to the latencies involved in traversing the I/O protocol stack. To avoid these drawbacks, in the implementations described herein, a destination SMC redirects memory accesses for a migrated VM to the source SMC (of previous VM host node), uses a DMA move engine to move VM data using separate virtual channels, and enhances directory state bits to store a directory status of each cache line of the VM being migrated.

FIG. 1 illustrates a multi-node system 100 according to implementations of the disclosure. The multi-node system 100 may include two or more trays 110, 150. A tray may refer to a component of a rack scale system. A rack scale system refers to a logical architecture that disaggregates compute, storage, and network resources and introduces the ability to pool these resources for more efficient utilization of assets. One or more trays may be used in a rack scale system, and each tray may contain the memory, storage, network, and compute modules for a rack in a rack scale system. A tray manager (not shown) manages these components and modules, and all components and trays are interconnected via photonics and switch fabrics in the rack scale system.

In one implementation, each tray 110, 150 may include multiple nodes 120 connected to pooled memory 102 via a shared memory controller (SMC) 104, 154. The pooled memory 102 can include any type of memory or storage technology, such as random access memory (RAM), read only memory (ROM), flash memory, or any other suitable memory systems. For example, pooled memory 102 may include dynamic random access memory (DRAM).

The pooled memory 102 may also be physical memory such as a hard drive, an optical drive, a thumbdrive, an array of drives, or any combinations thereof. In some embodiments, the pooled memory includes dual in-line memory modules (DIMMs). In some cases, these DIMMs may be next generation non-volatile memory (NVM)-based DIMMs, which enables a large memory capacity and both persistent as well as volatile memory characteristics. Additionally, in embodiments, a DIMM may be replaced by some other form-factor that is a collection of one or more memory or storage devices. The pooled memory 102 may be applicable for various server (e.g., cloud computing, enterprise), high-performance computing, and client usages.

In one implementation, the pooled memory 102 is accessed through the SMC 104, 154. Although one SMC 104, 154 per each tray 110, 150 is illustrated, the system 100 may have any number of SMCs 104, 154 residing on a tray 110, 150. The SMC 104, 154 may host multiple DIMMS. The SMC 104, 154 can support double data rate (DDR) buses, transactional DDR (DDR-T) buses, and other links/buses that enable connections with various memories that can be included in the pooled memory 102, including DRAM and non-volatile DIMM (NVDIMM). The pooled memory 102 can also support a different memory hierarchy, such as the two level memory (2LM) by hosting "Far Memory", assuming memory-side caching capability is included in the processor's integrated memory controller (iMC) on each node.

One or more nodes 120 may also be hosted on each tray 110, 150 of the system 100. Even though the system 100 illustrates two nodes 120 connected to one SMC on each tray 110, 150, any number of nodes 120 may be directly connected to multiple SMCs 104, 154. The nodes 120 may connect to the SMC 104, 154 to access the pooled memory 102. As shown in FIG. 1, a link 160 is used to connect each node to an SMC. The link 160 may be a Plattsmouth (PLM) link. In implementations of the disclosure, the link 160 is capable of supporting both memory semantics with optional directory information present in existing memory protocols, such as SMI3, and/or an I/O protocol with load and store functionality, such as a Peripheral Component Interconnect Express (PCIe) protocol. In some embodiments, any type of link 160 can be used to connect a node 120 to an SMC 104, 154 if the link can (1) support memory semantics and (2) implement an I/O protocol using a common set of pins.

In one embodiment, the link 160 may be implemented using the physical layer of the PCIe architecture. In addition to the I/O functionality enabled by the PCIe architecture, direct memory semantics are enabled using common PCIe pins. The memory semantics enable each node to communicate with the pooled memory 102 as if it were directly connected to the pooled memory 102. For example, the link 160 may send directory information, memory address locations, and block memory locations on a common set of PCIe pins. In this manner, the node 120 can use a standard link to gain access to any type of memory connected to the SMC 104, 154. The node 120 can be updated or replaced without any re-validation of the pooled memory 102, as the connection between the node 120 and the pooled memory 102 remains constant. Additionally, memory upgrade cycles can be independent of CPU upgrade cycles. For example, the pooled memory 102 can be replaced after several CPU upgrades, providing significant cost savings to the customer.

In embodiments of the disclosure, multiple SMCs 104, 154 (within or between trays 110, 150) may be connected to each other through links 160. In one implementation, link 160 is a PLM link. In other implementations, multiple SMCs 104, 154 may also be connected to each other through a traditional networking stack such as Ethernet, Infiniband, StormLake, and the like, as long as the networking hardware is capable of delivering the data packets or flits to the destination SMCs. Specifically, the traditional networking hardware may use independent virtual lanes (also referred to as virtual channels) to enable QoS for the PLM protocol. In any event, the one or more SMCs 104, 154 may enable DMA through hardware with no software-induced latency.

DMA refers to a feature of computer systems that allows certain hardware subsystems to access main system memory (RAM) independently of a central processing unit (CPU). DMA can also be used for "memory to memory" copying or moving of data within memory.

Additionally, the SMCs 104, 154 and the nodes 120 may connect to a network connectivity block 105. In some embodiments, the network connectivity block 105 is a network interface controller (NIC) that may be configured to connect the nodes 120 and each of the SMCs 104, 154 to a network 115. The network 115 can be a wire line network, a wireless network, or a cellular network. The network 115 may be any wide area network (WAN), any local area network (LAN), or the Internet, among others. For example, network 115 can be 3GPP LTE network or a WiFi network. Accordingly, the nodes 120 are not restricted to one type of connection. Rather, the nodes 120 can link to various resources using multiple links. In some cases, access to the network 115 provides access to additional memory devices and storage drives, and the SMCs 104, 154 may use the network 115 to allocate the additional memory devices and storage drives.

Nodes 120 may include a CPU 122 that is to execute stored instructions. The CPU 122 can be a single core processor (also referred to as a "processing device"), a multi-core processor, a computing cluster, or any number of other configurations. In some cases, the CPU 122 and other components of the node 120 may be implemented as a system-on-chip (SoC). Furthermore, the node 120 may include more than one CPU 122.

The CPU 122 may be connected (e.g., via a bus) to an I/O interface device 124. The I/O interface device 124 may be used to allow the CPU 122 to access the pooled memory 102 in the system 100. The CPU 122 can access the pooled memory 102 without including dedicated memory within the node 120. The I/O interface device 124 may also be used to connect the node 120 to one or more I/O devices (not shown). The I/O devices may include, but are not limited to, a keyboard and a pointing device, where the pointing device may include a touchpad or other touchscreen, among others. The I/O devices may be built-in components of the node 120 or may be devices that are externally connected to the node 120. The node 120 may include any number of additional components not shown in FIG. 1, depending on the details of the specific implementation. Moreover, the node 120 may include fewer components that those illustrated in FIG. 1.

In one implementation, the CPU 122 may execute a virtualization system to allow multiple instances of one or more operating systems to execute on the node 120. The virtualization system may be implemented in hardware (also known as hardware-assisted virtualization). The instruction set of CPU 122 may be extended to include instructions to launch and exit VMs 128 so that the virtualization system of the node 120 may be implemented in a hardware-assisted fashion. In hardware-assisted virtualization, a software module known as a virtual machine manager (VMM) 126, also referred to as a hypervisor, may be used to create and manage one or more VMs 128 (also referred to as guest machines). The VMM 126 may present each VM 128 with a guest operating system and manage the execution of the guest operating system. Application software (also referred to as guest software) may be executed on the VMs 128. Thus, multiple instances of application software may be executed on VMs 128 by sharing the hardware resources of the node 120 through the virtualization system provided by the node 120.

The VMM 126 may run directly on the node's 120 hardware by controlling hardware components of node 120 and manage guest operating systems of VMs 128. This is commonly referred to as a type-I VMM. Alternatively, VMM 126 may run within the operating system (also referred to as host operating system) of node 120. This is commonly referred to as a type-II VMM. Under either type of VMM 126, instructions of guest operating system and guest application software executed on VMs 128.

In some implementations, a VM 128 may be migrated from one node 120 (a source node) to another node 120 (a destination node). The migration of a VM 128 may occur for a variety of reasons including, for example, load balancing. A VM 128 may be migrated to the destination node 120 that is located on the same tray 110, 150 as the VM's 128 source node 120, or may be migrated to a destination node 120 on a different tray 110, 150 than the source node 120. For example, as shown in FIG. 1, a first instance of a VM 128A at a node 120 (i.e. source node) of tray 1 110 is illustrated as being migrated to another node 120 (i.e., destination node) of tray 2 150 and executed as a second instance of the VM 128B. In some implementations, a VM 128 may be live migrated to another node 120. A live migration of a VM 128 refers to the process of moving a running VM 128 between different nodes without disconnecting the client (user of the VM) from the VM 128 session. As part of a VM 128 migration (live or otherwise), memory, storage, and network connectivity of the VM 128 are transferred from the source node to the destination node.

Implementations of the disclosure address memory migration of a VM 128 when migrating the VM 128 between nodes 120. More specifically, implementations of the disclosure redirect memory accesses from a new location (i.e., destination node) of a migrated VM 128 to an old location (i.e., source node) of the migrated VM 128, use a DMA move engine to move VM data using separate virtual channels, and enhance directory state bits to store a directory status of each cache line of the VM 128 being migrated. Implementations of the disclosure may also be used to migrate memory for purposes other than virtualization, such as moving data sets from one node 120 to another node 120.

With respect to memory of the nodes 120 and corresponding VMs 128, the SMCs 104, 154 may maintain the address ranges for each of the nodes 120 (and accordingly, the hosted VMs 128 executing on the nodes 120) that the SMCs 104, 154 are directly connected. The SMCs 104, 154 are aware of a node identifier (nodeid) and can utilize that nodeid to map any address used by the node 120 to a physical address in the pooled memory 102 (e.g., DIMMs) managed by the SMCs 104, 154. In one implementation, hardware range registers are utilized by the SMCs 104, 154 to map node address ranges to the shared memory (e.g., pooled memory 102) managed by the SMC 104, 154. In another implementation, page tables are utilized by the SMCs 104, 154 to map node address ranges to the shared memory (e.g., pooled memory 102) managed by the SMC 104, 154.

In one implementation, when a VM 128 is migrated from a source node 120 to a destination node 120, range registers in the SMC 104, 154 that track the address range corresponding to the old VM 128 are changed to correspond to the address range that the new VM 128 uses. This enables the newly-transferred VM 128 to start executing immediately as it can still access its memory. The SMCs 104, 154, may include a set of dedicated range registers to perform this redirection function.

In another implementation, the SMCs 104, 154 can implement a page table structure that the system software changes from the old VM's 128 source address to the new VM's 128 source address. The page table structure offers flexibility to support multiple VM migrations at the expense of hardware complexity and storage overhead (for the page table structures).

In one implementation, the VM migration can be within the same tray 110, 150 or across trays 110, 150, across SMCs 104, 154 connected directly through a PLM Link or going over multiple PLM links, or could be connected through a network that is tunneling a PLM protocol. Stalling the migrated VM's execution until after the memory migration completes may have negative performance and Quality of Service (QoS) implications. As such, memory content of the VM 128 may be transferred to the destination SMC 104, 154. The memory content of the VM 128 may be transferred for proximity reasons (e.g., lower latency and less bandwidth demand, especially if crossing multiple SMCs 104, 154 for memory requests), for power savings reasons (e.g., powering down an entire tray after migrating the VMs 128 and their contents to a different tray), or for lowering memory fragmentation (e.g., if implementing the redirection through range registers as those are fixed hardware resources).

Implementations of the disclosure utilize a DMA move engine 106 and a demand request component 108 of SMC 104, 154 to enable the migration of the VM 128 to occur asynchronously with the memory transfer of the VM 128 (e.g., the memory transfer may occur subsequent to the VM migration). This asynchronous memory migration may include a data move process and a demand request process. The DMA move engine 106 manages the data move process by asynchronously copying data of a migrated VM from a source memory location (of the VM) managed by a source SMC 104, 154 to a destination memory location (of the VM) managed by a destination SMC 104, 154. The demand request component 108 manages demand read requests issued to a destination SMC 104, 154 (corresponding to a migrated VM) and enables a seamless response to the demand read request while the data move process is occurring. Further details regarding the DMA move engine 106 and demand request component 108, as well as their corresponding functions, are described below with respect to FIG. 2.

Figure 2:
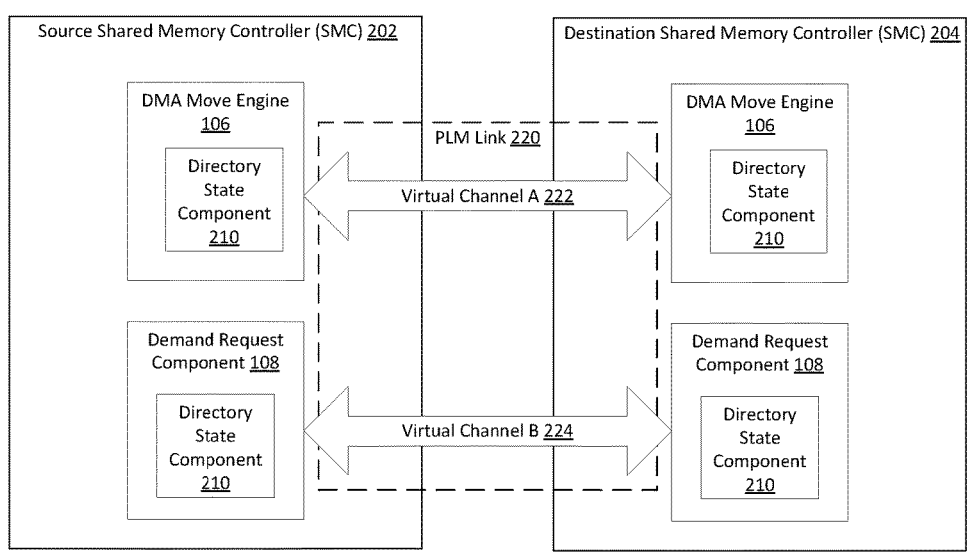
FIG. 2 illustrates a block diagram of a system of connected shared memory controllers (SMCs) enabling VM migration, according to one embodiment.

FIG. 2 illustrates a block diagram of a system 200 of connected SMCs enabling VM migration, according to one embodiment. System 200 includes a source CMS 202 and a destination SMC 204 communicably coupled via a link, which is illustrated as a PLM link 220. In other implementations, a different type of link other than a PLM link may be utilized to communicably couple SMCs 202, 204. Source SMC 202 and destination SMC may the same as SMCs 104, 154 described with respect to FIG. 1. In one implementation, a VM, such as VM 128 described with respect to FIG. 1, is migrated from a node utilizing memory managed by the source SMC 202 to a node utilizing memory managed by the destination SMC 204. For ease of explanation and exemplary purposes, it can be assumed that source SMC 202 may be the same as SMC 104 of tray 110 and destination SMC 204 may be the same as SCM 154 of tray 2 150, as described with respect to FIG. 1. Thus, for purposes of the following discussion, it may be assumed that a VM 128 is migrated from a node 120 hosted on tray 1 110 to a node 120 hosted on tray 2 150.

Referring to FIG. 2, each of source SMC 202 and destination SMC 204 may include a DMA move engine 106 and a demand request component 108 that are the same as their counterparts described with respect to FIG. 1. As discussed above, the DMA move engine 106 performs the VM data move from a source memory pool (such as pooled memory 102 at tray 1 110 described with respect to FIG. 1) to a destination memory pool (such as pooled memory 102 at tray 2 150 described with respect to FIG. 1). The DMA move engine 106 may be implemented as a combination of hardware and/or software.

The DMA move engine 106 can implement either a push model or a pull model for the data move process. In the push model, the source SMC 202 sends the VM data to the destination SMC 204 as writes. In the pull model, the destination SMC 204 requests from the source SMC 202 the addresses it seeks to copy over. The transfer can be in units of multiples of cache lines.

As shown in FIG. 2, a separate virtual channel (VC) A 222 of the PLM link 220 may be established between the source SMC 202 and the destination SMC 204. A VC refers to a separate communication channel created within a physical communication link, such as the PLM link 220. PLM link 220 may be divided into one or more VCs, where each VC multiplexes the resources (e.g., bandwidth, etc.) of the PLM link 200. The VC A 222 may be used for purposes of the transmitting the VM data and directory state bit metadata between the source SMC 202 and destination SMC 204. The directory state bit metadata is described further below.

Along with each unit of data of the VM that is transferred, a directory state bit metadata (corresponding to the unit of transferred data) of the source SMC 202 is transferred to the destination SMC 204. The directory state bit metadata corresponds to a directory state bit encoding maintained with each cache line. The directory state bit encodings are used to help with the data move process (described above) and the demand request process (described further below). In one implementation, the directory state bit encodings may correspond to any of four directory states: Invalid (I), Shared (S), Exclusive (E), Transferred (T). The I, S, and E states may correspond to the MESI protocol for cache and memory coherency. For example, the I state indicates that the corresponding cache line is invalid (unused). The S state indicates that the cache line may be stored in other caches of the machine and is clean (i.e., it matches the main memory). The E state indicates that the cache line is present only in the current cache, but is clean. The E state may be changed to an S state at any time in response to a read request. Implementations of the disclosure further introduce a T state. The T state denotes the state in the source SMC 202 that the cache line has already been sent to the destination SMC 204 for a request that asked for the line.

In one embodiment, both the source SMC 202 and the destination SMC 204 scan the cache lines being transferred to update the directory state to state I prior to transferring the cache lines (both at the source and the destination side). In one implementation, a directory state component 210 of the DMA move engine 106 at both of the source and destination SMCs 202, 204 accesses and updates the directory state bit encodings for the cache lines. The following Table 1 describes the behavior at the source and destination SMCs 202, 204 when the data is copied to the destination through the data move process.

TABLE 1

Data Move Process

| Source SMC Initial State → Final State | Destination SMC Action and Cache Line Directory State |
|---|---|
| I/S/E (→ I) | Copy the cache Line (Directory State at Destination SMC → I) |
| T (→ I) | Ignore [Data already present—no change to directory state either] |

While the data move process is occurring at the DMA move engine 106, the destination SMC 204 may receive one or more demand read requests for VM data of the migrated VM. Demand read requests may include a Demand Read_Shared request noting that the requestor seeks to have the line "shared", a Demand Read_Current request seeking a coherent snap-shot, and a Demand Read_Exclusive request for an exclusive copy of the data. As discussed above, the demand request component 108 of the destination SMC 204 handles such demand read requests. The demand request component 108 may be implemented as a combination of hardware and/or software. A directory state component 210 of the demand request component 108 may access a cache line associated with the demand request data and reference the directory state bit encoding associated with the cache line in order to determine a directory state of the cache line.

When a directory state component 210 of the demand request component 108 accesses the directory state bit encodings, it determines whether the data has already been transferred to the destination SMC 204 (i.e., directory state bit encoding is state T). If the data has already been transferred, the destination SMC 204 serves the request. In one implementation, if the data has not yet been transferred, the destination SMC 204 can wait for the data to come before serving the request. However, that may result in delay for the request.

In another implementation, if the data has not yet been transferred, the destination SMC 204 can forward the demand read request to the source SMC 202 using a separate second VC B 224 of the PLM link 220. The separate VC B 224 for the demand read request/response process is established to ensure that there is no deadlock in the system 200. The demand request component 108 of the source SMC 202 can receive the demand request and handle providing a response to the destination SMC 204 based on the current directory state bit encoding of the requested cache line at the source SMC 202. The response may include the requested data as well as the corresponding directory state metadata for the cache line. The demand request component 108 of the destination SMC 204 forwards the data response received from the source SMC 202 to the requestor and updates its own memory and directory state bit encodings after it receives the response from the source SMC 202.

The following Table 2 describes the behavior at the source and destination SMCs 202, 204 for demand read requests (e.g., Read_Shared, Read_Current, Read_Exclusive) via the demand request process.

TABLE 2

Demand Request Process

| Demand Request Type | Source SMC Initial State → Final State | Source SMC Action | Destination SMC Action and State → Destination SMC Directory State |
|---|---|---|---|
| Read_Shared (or Read_Current) | I/S/E → T | Send the data with state as I if Read_Current and | Copy Data to memory and send data to requestor. |

TABLE 2-continued

Demand Request Process

| Demand Request Type | Source SMC Initial State → Final State | Source SMC Action | Destination SMC Action and State → Destination SMC Directory State |
|---|---|---|---|
| Read_Shared (or Read_Current) | T → T | Send data with state as T | state as S if Read_Shared Destination SMC directory state same as what source SMC sends (I or S) Ignore the incoming data/state completely. Serve the request based on destination SMC's current directory state. [This indicates data has already been transferred based on a prior Demand request.] |
| Read_Exclusive | I/S/E → T | Send the data with state as E | Copy Data to memory and send data to requestor. (Destination SMC directory State is E) |
| Read_Exclusive | ET → ET | Send data with state as ET | Ignore the incoming data/state completely. Serve the request based on destination SMC's current directory state. [This indicates data has already been transferred based on a prior Demand request.] |

Figure 3:
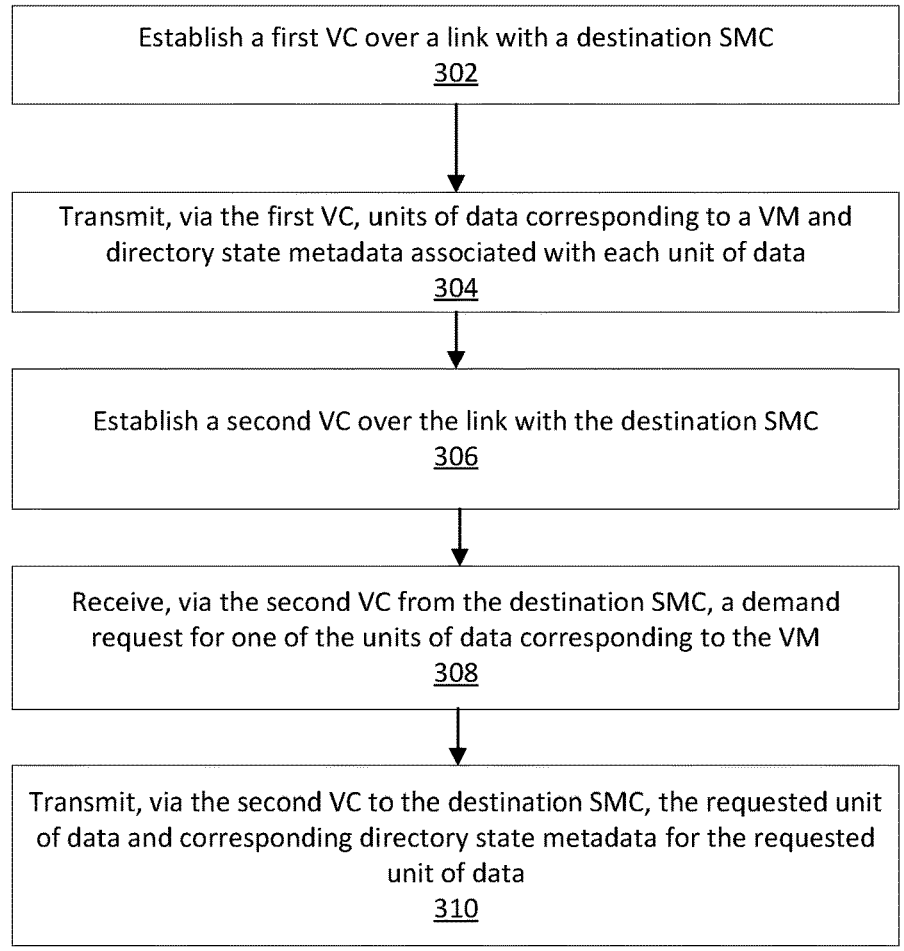
FIG. 3 is a flow diagram of a method of virtual machine (VM) migration in a rack scale system, according to one embodiment.

FIG. 3 is a flow diagram of a method 300 of VM migration in a rack scale system according to another embodiment. Method 300 may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 300 may be performed, in part, by processing logic implemented in source SMC 202 of FIG. 2.

For simplicity of explanation, the method 300 is depicted and described as a series of acts. However, acts in accordance with this disclosure can occur in various orders and/or concurrently and with other acts not presented and described herein. Furthermore, not all illustrated acts may be performed to implement the method 300 in accordance with the disclosed subject matter. In addition, those skilled in the art will understand and appreciate that the method 300 could alternatively be represented as a series of interrelated states via a state diagram or events.

Referring to FIG. 3, at block 302, the processing logic establishes a first VC over a link with a destination SMC. In one implementation, the destination SMC is coupled to a destination node hosting a VM, where the VM is migrated to the destination node from a source node coupled to the source SMC. In another implementation, the link is to support both memory semantics and an input/output (I/O) protocol. The link may be a Plattsmouth (PLM) link and/or use at least one of a common set of pins or a networking stack. In further implementations, the source SMC manages memory access to pooled memory that is shared by the source node and other nodes in a multi-node system.

At block 304, the processing logic transmits, via the first VS, units of data corresponding to the VM and directory state metadata associated with each unit of data. In one implementation, for each unit of data that is transferred via the first VC, a directory state bit encoding corresponding to the unit of data at the source SMC is marked as invalid. The directory state metadata may correspond to the directory state bit encodings, which are maintained with the units of data. The directory state bit encodings may include an invalid state, a shared state, an exclusive state, and a transferred state. In some implementations, each unit of data comprises a cache line corresponding to memory of the VM.

At block 306, the processing logic establishes a second VC over the link with the destination SMC.

At block 308, the processing logic receives, via the second VC from the destination SMC, a demand request for a unit of data corresponding to the VM.

Lastly, at block 310, the processing logic transmits, via the second VC to the destination SMC, the requested unit of data and corresponding directory state metadata for the requested unit of data. In one implementation, subsequent to transmitting the units of data via the second VC, a directory state bit encoding corresponding to each of the requested units of data at the source SMC is updated to reflect a transferred state. In some implementations, receiving the demand request and transmitting the requested unit of data at blocks 308 and 310 may occur while the units of data are transmitted at block 304.

Figure 4:
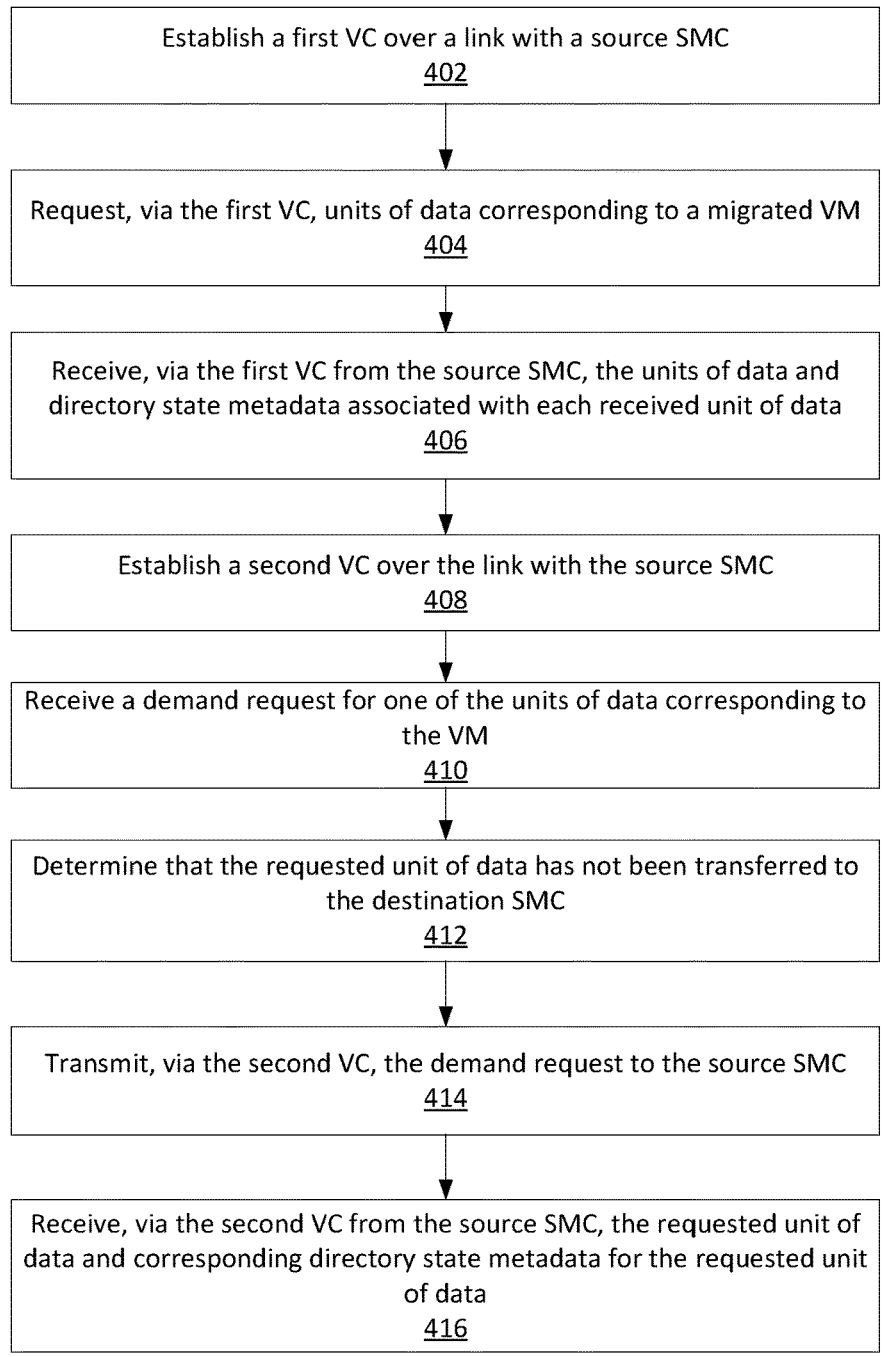
FIG. 4 is a flow diagram of another method of VM migration in a rack scale system, according to another embodiment.

FIG. 4 is a flow diagram of another method 400 of VM migration in a rack scale system, according to another embodiment. Method 400 may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 400 may be performed, in part, by processing logic implemented in destination SMC 204 of FIG. 2.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, at block 402, the processing logic establishes a first VC over a link with a source SMC. In one implementation, the source SMC is coupled to a source node that hosted a VM that migrated to a second node that is coupled to the destination SMC. In a further implementation, the link is to support both memory semantics and an input/output (I/O) protocol. The link may include a Plattsmouth (PLM) link and/or may use at least one of a common set of pins or a networking stack. In one implementation, the destination SMC manages memory access to pooled memory that is shared by the destination node and other nodes in a multi-node system.

At block 404, the processing logic requests, via the first VC, units of data corresponding to a migrated VM. In some implementations, each unit of data may include a cache line corresponding to memory of the VM.

At block 406, the processing logic receives, via the first VC from the source SMC, the units of data and directory state metadata associated with each received unit of data. In one implementation, for each unit of data that is received, a directory state bit encoding corresponding to the unit of data at the destination SMC is marked as invalid. In one implementation, the directory state metadata corresponds to directory state bit encodings maintained with the units of data. The directory state bit encodings may include an invalid state, a shared state, an exclusive state, and a transferred state.

At block 408, the processing logic establishes a second VC over the link with the source SMC.

At block 410, the processing logic receives a demand request for a unit of data corresponding to the VM.

At block 412, the processing logic determines that the requested unit of data has not been transferred to the destination SMC.

At block 414, the processing logic transmits, via the second VC, the demand request to the source SMC.

Lastly, at block 416, the processing logic receives, via the second VC from the source SMC, the requested unit of data and corresponding directory state metadata for the requested unit of data. In one implementation, subsequent to receiving the requested unit of data, a directory state bit encoding corresponding to the requested unit of data is updated according to the received directory state metadata. In a further implementation, the receiving the demand request, transmitting the demand request, and receiving the requested unit of data of blocks 410, 414, and 416 may be performed concurrently with receiving the units of data at block 406.

Figure 5:
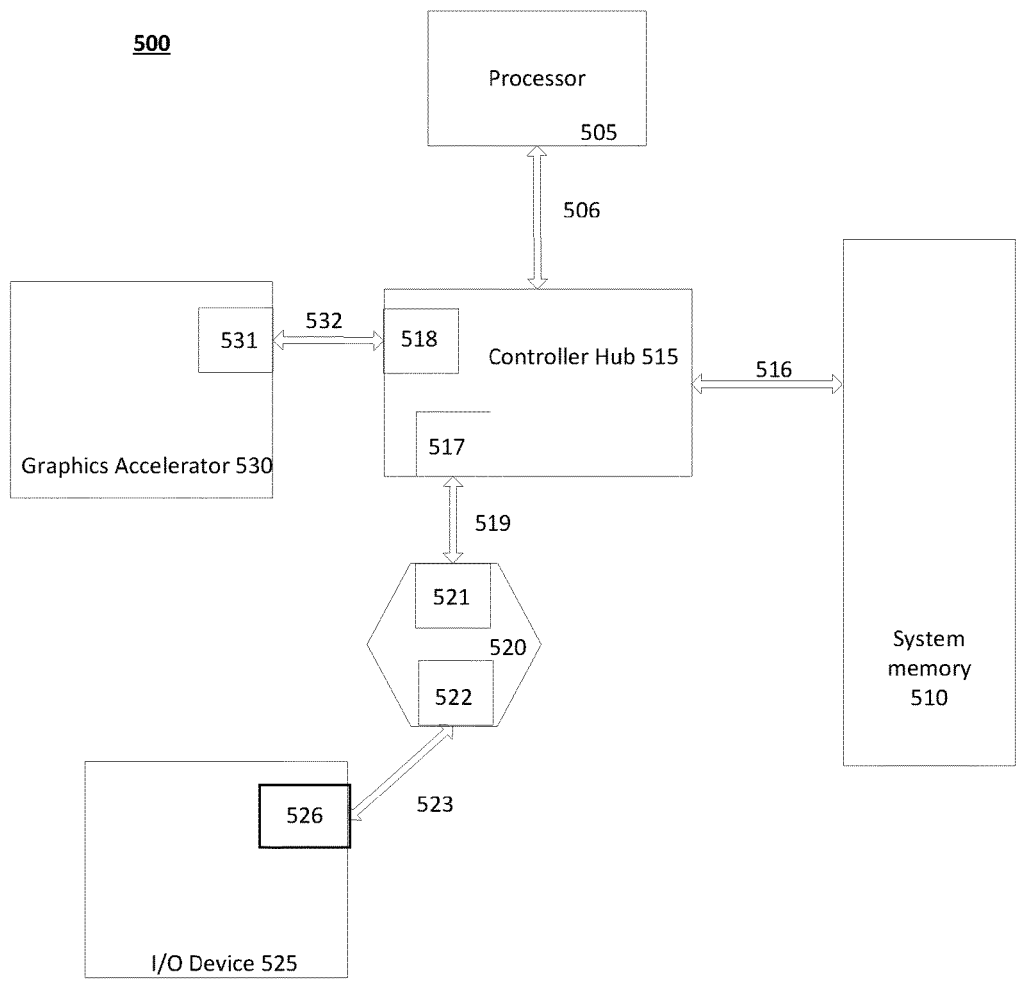
FIG. 5 illustrates a computing system with multiple interconnects with a mid-speed interface, according to one embodiment.

Referring to FIG. 5, an embodiment of a computer system 500 with multiple interconnects with a mid-speed interface is illustrated. System 500 includes processor 505 and system memory 510 coupled to controller hub 515. Processor 505 includes any processing element, such as a microprocessor, a host processor, an embedded processor, a co-processor, or other processor. Processor 505 is coupled to controller hub 515 by an interface 506 (e.g., front-side bus (FSB), and so forth). In one embodiment, interface 506 is a serial point-to-point interconnect as described below. In another embodiment, interface 506 includes a serial, differential interconnect architecture that is compliant with different interconnect standard.

System memory 510 includes any memory device, such as random access memory (RAM), non-volatile (NV) memory, or other memory accessible by devices in system 500. In one embodiment, processor 505 interfaces directly to system memory 510. In another embodiment, processor 505 is coupled to system memory 510 through controller hub 515. System memory 510 may be coupled to controller hub 515 through memory interface 516. Examples of a memory interface include a double-data rate (DDR) memory interface, a dual-channel DDR memory interface, and a dynamic RAM (DRAM) memory interface.

In one embodiment, controller hub 515 is a root hub, root complex, or root controller in an interconnection hierarchy. Examples of controller hub 515 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 505, while controller 515 is to communicate with I/O devices, in a similar manner as described below. In some embodiments, peer-to-peer routing is optionally supported through root complex 515.

Here, controller hub 515 is coupled to switch/bridge 520 through serial link 519. Input/output modules 517 and 521, which may also be referred to as interfaces/ports 517 and 521, include/implement a layered protocol stack to provide communication between controller hub 515 and switch 520. In one embodiment, multiple devices are capable of being coupled to switch 520.

Switch/bridge 520 routes packets/messages from device 525 upstream, i.e. up a hierarchy towards a root complex, to controller hub 515 and downstream, i.e. down a hierarchy away from a root controller, from processor 505 or system memory 510 to device 525. Switch 520, in one embodiment, is referred to as a logical assembly of multiple virtual bridge devices. Device 525 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, a camera, an RF component, and other input/output devices. Such a device may be referred to as an endpoint. Although not specifically shown, device 525 may include a bridge to support other devices.

Graphics accelerator 530 is also coupled to controller hub 515 through serial link 532. In one embodiment, graphics accelerator 530 is coupled to an MCH, which is coupled to an ICH. Switch 520, and accordingly I/O device 525, is then coupled to the ICH. I/O modules 531 and 518 are also to implement a layered protocol stack to communicate between graphics accelerator 530 and controller hub 515. Similar to the MCH discussion above, a graphics controller or the graphics accelerator 530 may be integrated in processor 505.

I/O device 525 includes an interface 526 and switch/bridge 520 includes an interface 522. Interface 526 is coupled to interface 522 via serial link 523. Interface 522 may send a first plurality of packets at a clock rate to interface 526, interface 522 may send a speed-switch packet to interface 526, and interface 522 may send a second plurality of packets to interface 526 at a PLL rate.

In one embodiment, system 500 may be implemented as node 120 as described with respect to FIG. 1.

Figure 6:
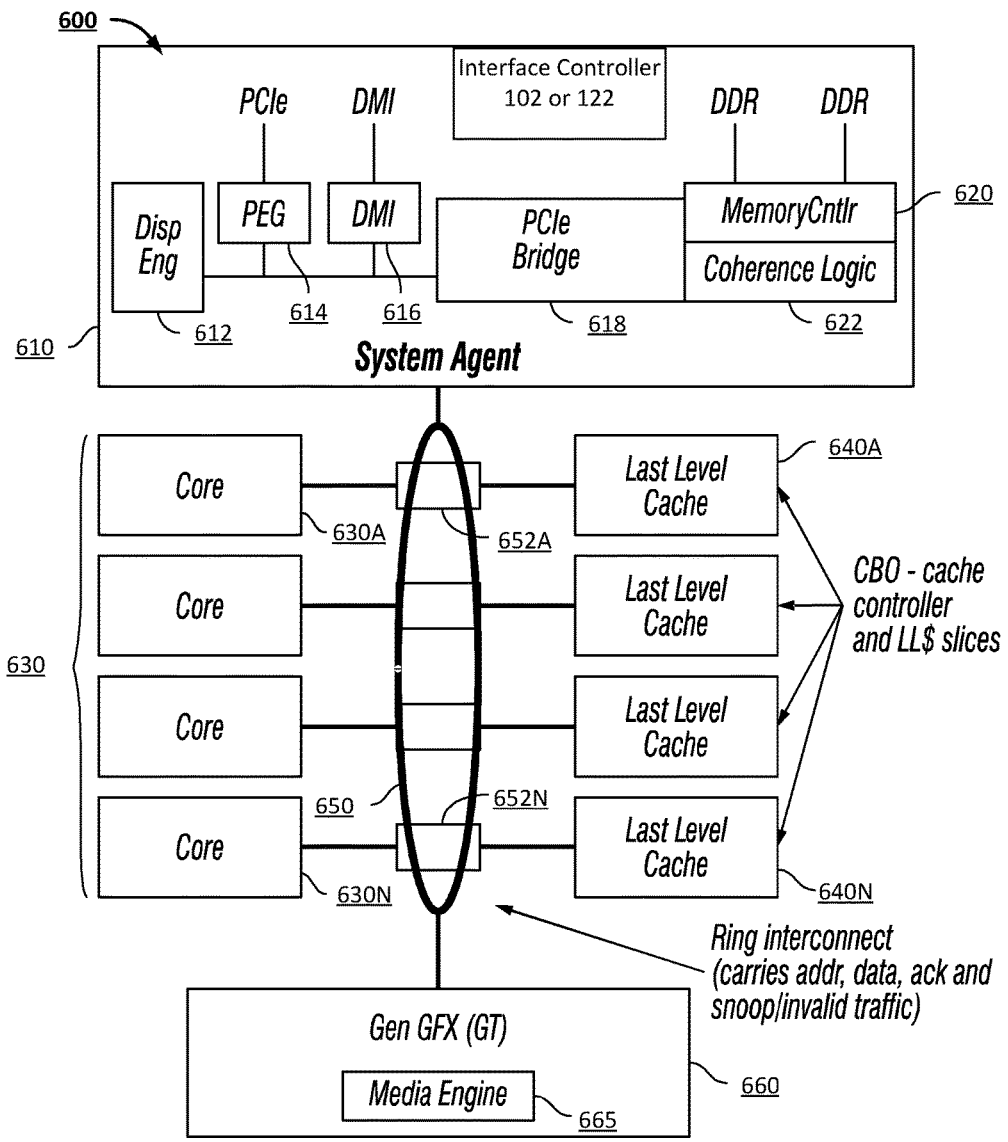
FIG. 6 illustrates a block diagram of a multicore processor, according to one embodiment.

Referring now to FIG. 6, shown is a block diagram of an embodiment of a multicore processor. As shown in the embodiment of FIG. 6, processor 600 includes multiple domains. Specifically, a core domain 630 includes a plurality of cores 630A-630N, a graphics domain 660 includes one or more graphics engines having a media engine 665, and a system agent domain 610. In one implementation, processor 600 may be implemented as CPU 122 described with respect to FIG. 1.

In various embodiments, system agent domain 610 handles power control events and power management, such that individual units of domains 630 and 660 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 630 and 660 may operate at different voltage and/or power, and furthermore the individual units within the domains each potentially operate at an independent frequency and voltage. Note that while only shown with three domains, understand the scope of the present disclosure is not limited in this regard and additional domains may be present in other embodiments.

As shown, each core 630 further includes low level caches in addition to various execution units and additional processing elements. Here, the various cores are coupled to each other and to a shared cache memory that is formed of a plurality of units or slices of a last level cache (LLC) 640A-640N; these LLCs often include storage and cache controller functionality and are shared amongst the cores, as well as potentially among the graphics engine too.

As seen, a ring interconnect 650 couples the cores together, and provides interconnection between the core domain 630, graphics domain 660 and system agent circuitry 610, via a plurality of ring stops 652A-652N, each at a coupling between a core and LLC slice. As seen in FIG. 6, interconnect 650 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, Intel® On-chip System Fabric (IOSF), an Advanced Microcontroller Bus Architecture (AMBA) interconnect, a multi-dimensional mesh fabric, or other known interconnect architecture) may be utilized in a similar fashion.

As further depicted, system agent domain 610 includes display engine 612 which is to provide control of and an interface to an associated display. System agent domain 610 may include other units, such as: an integrated memory controller 620 that provides for an interface to a system memory (e.g., a DRAM implemented with multiple DIMMs; coherence logic 622 to perform memory coherence operations. Multiple interfaces may be present to enable interconnection between the processor and other circuitry. For example, in one embodiment at least one direct media interface (DMI) 616 interface is provided as well as one or more PCIe® interfaces 614 (e.g., PCIe® Graphics (PEG) port interfaces for PEG adapters). The display engine and these interfaces typically couple to memory via a PCIe® bridge 618.

Figure 7:
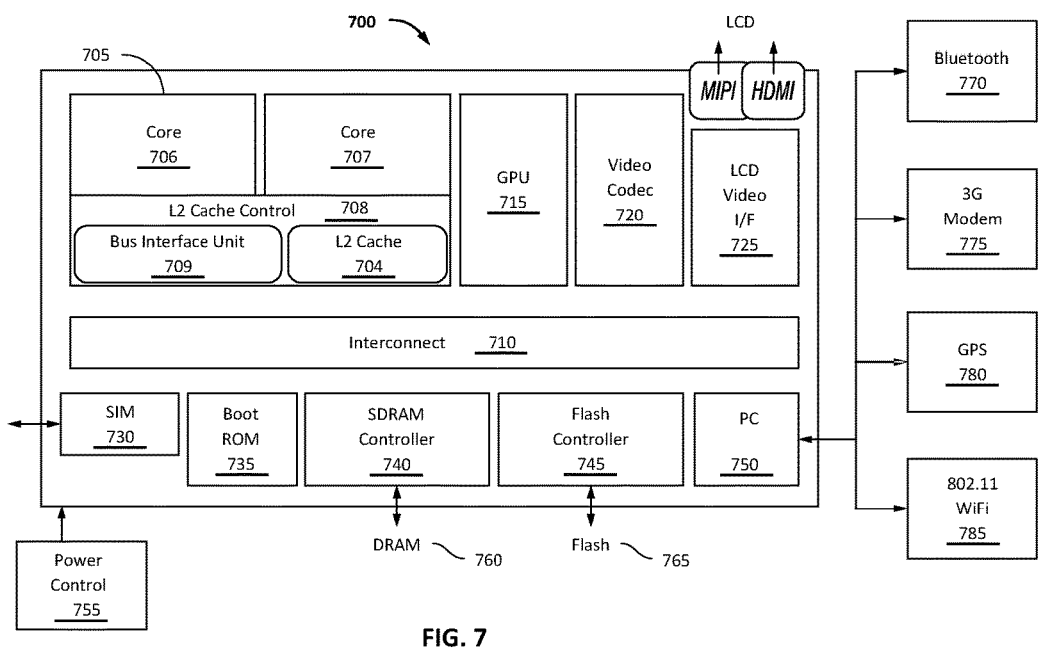
FIG. 7 illustrates a system on a chip (SOC) design, according to one embodiment.

Turning next to FIG. 7, an embodiment of a system on-chip (SOC) design in accordance with the disclosures is depicted. As a specific illustrative example, SOC 700 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network. In another embodiment SOC 700 is implemented as node 120 described with respect to FIG. 1.

Here, SOC 700 includes 2 cores—706 and 707. Similar to the discussion above, cores 706 and 707 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache control 708 that is associated with bus interface unit 709 and L2 cache 704 to communicate with other parts of system 700. Interconnect 710 includes an on-chip interconnect, such as an IOSF, AMBA, or other interconnect discussed above, which potentially implements one or more aspects of the described disclosure.

Interface 710 provides communication channels to the other components, such as a Subscriber Identity Module (SIM) 730 to interface with a SIM card, a boot ROM 735 to hold boot code for execution by cores 706 and 707 to initialize and boot SOC 700, a SDRAM controller 740 to interface with external memory (e.g. DRAM 760), a flash controller 745 to interface with non-volatile memory (e.g. Flash 765), a peripheral control Q1650 (e.g. Serial Peripheral Interface) to interface with peripherals, video codecs 720 and Video interface 725 to display and receive input (e.g. touch enabled input), GPU 715 to perform graphics related computations, etc. Any of these interfaces may incorporate aspects of the disclosure described herein.

Interconnect 710 may connect with another component via a mid-speed interface 115 (e.g., on-chip interconnect, IOSF, AMBA, or other interconnect).

In addition, the system illustrates peripherals for communication, such as a Bluetooth® module 770, 3G modem 775, GPS 780, and Wi-Fi® 785. Note as stated above, a UE includes a radio for communication. As a result, these peripheral communication modules are not all required. However, in a UE some form a radio for external communication is to be included.

Figure 8:
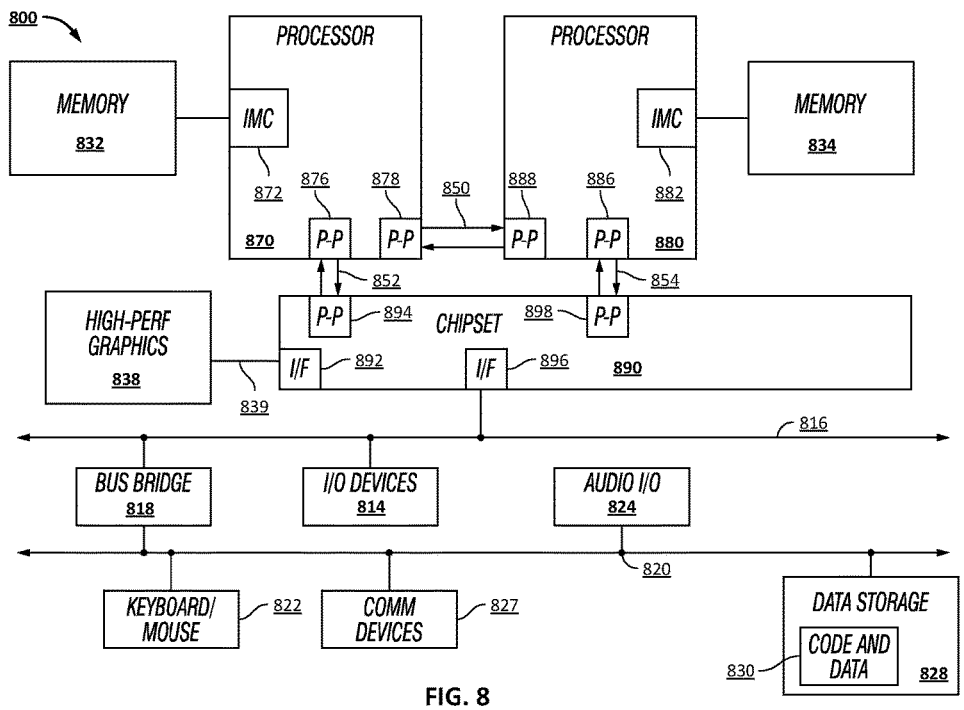
FIG. 8 illustrates a block diagram for a computing system, according to one embodiment.

Referring now to FIG. 8, shown is a block diagram of a system 800 in accordance with an embodiment of the disclosure. As shown in FIG. 8, multiprocessor system 800 is a point-to-point interconnect system, and includes a first processor 870 and a second processor 880 coupled via a point-to-point interconnect 850. Each of processors 870 and 880 may be some version of a processor. In one embodiment, 852 and 854 are part of a serial, point-to-point coherent interconnect fabric, such as Intel® Quick Path Interconnect (QPI) architecture. As a result, the disclosure may be implemented within the QPI architecture.

While shown with only two processors 870, 880, it is to be understood that the scope of the present disclosure is not so limited. In other embodiments, one or more additional processors may be present in a given processor.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 each exchange information with a chipset 890 via individual P-P interfaces 852, 854 using point to point interface circuits 876, 894, 886, 898. Chipset 890 also exchanges information with a high-performance graphics circuit 838 via an interface circuit 892 along a high-performance graphics interconnect 839.

Chipset 890 may connect with another component via a mid-speed interface 115 (e.g., P-P interface 852, P-P interface 854, high-performance graphics interconnect 839, bus 816, and so forth).

A shared cache (not shown) may be included in either processor or outside of both processors; yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 are coupled to first bus 816, along with a bus bridge 818 which couples first bus 816 to a second bus 820. In one embodiment, second bus 820 includes a low pin count (LPC) bus. Various devices are coupled to second bus 820 including, for example, a keyboard and/or mouse 822, communication devices 827 and a storage unit 828 such as a disk drive or other mass storage device which often includes instructions/code and data 830, in one embodiment. Further, an audio I/O 824 is shown coupled to second bus 820. Note that other architectures are possible, where the included components and interconnect architectures vary. For example, instead of the point-to-point architecture of FIG. 8, a system may implement a multi-drop bus or other such architecture. In one implementation, system 800 may be implemented as node 120 described with respect to FIG. 1.

Figure 9:
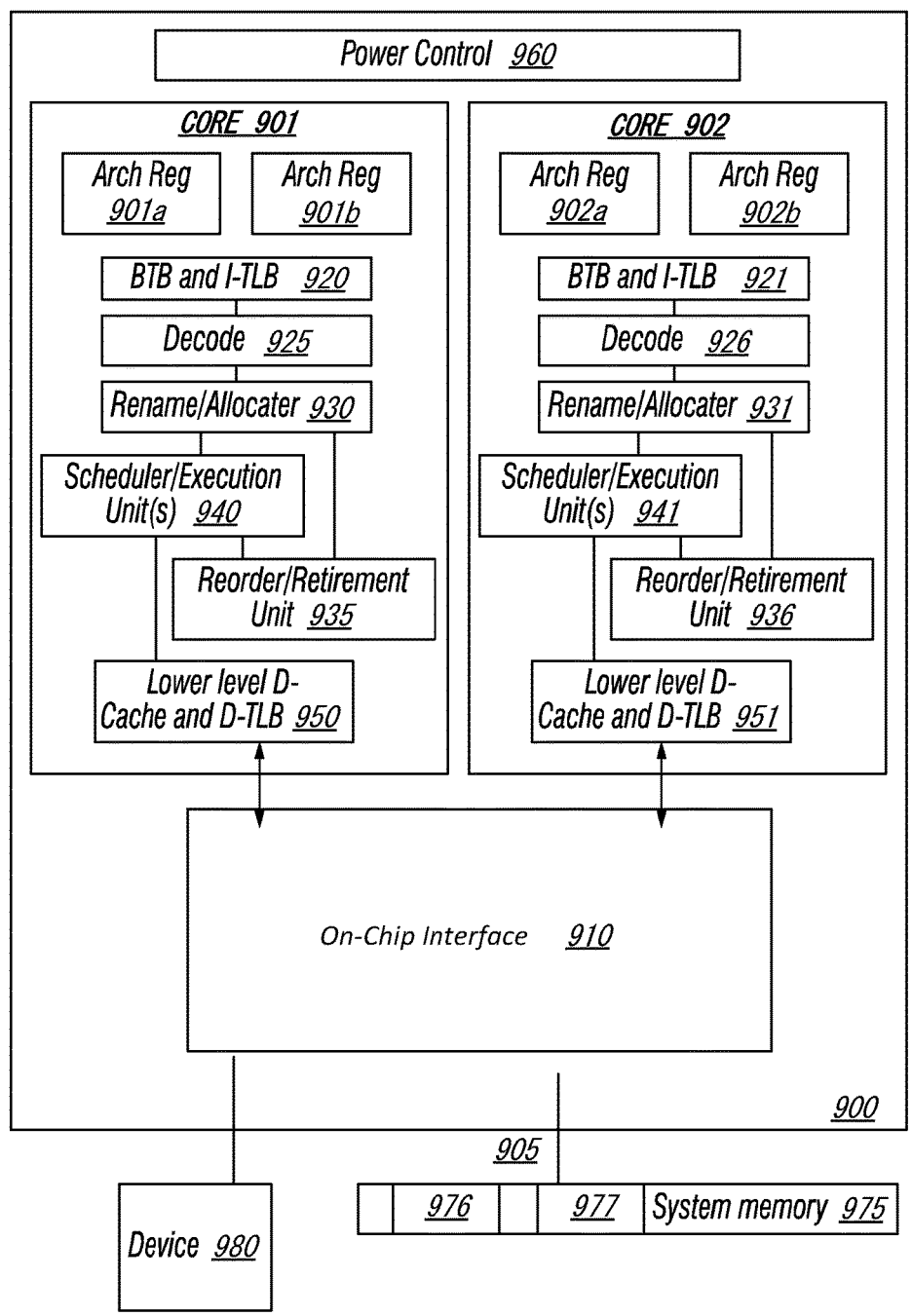
FIG. 9 illustrates an embodiment of a block diagram for a computing system including a multicore processor.

Referring to FIG. 9, an embodiment of a block diagram for a computing system including a multicore processor is depicted. Processor 900 includes any processor or processing device, such as a microprocessor, an embedded processor, a digital signal processor (DSP), a network processor, a handheld processor, an application processor, a co-processor, a system on a chip (SOC), or other device to execute code. Processor 900, in one embodiment, includes at least two cores—core 901 and 902, which may include asymmetric cores or symmetric cores (the illustrated embodiment). However, processor 900 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 900, as illustrated in FIG. 9, includes two cores—core 901 and 902. Here, core 901 and 902 are considered symmetric cores, i.e. cores with the same configurations, functional units, and/or logic. In another embodiment, core 901 includes an out-of-order processor core, while core 902 includes an in-order processor core. However, cores 901 and 902 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 901 are described in further detail below, as the units in core 902 operate in a similar manner in the depicted embodiment.

As depicted, core 901 includes two hardware threads 901a and 901b, which may also be referred to as hardware thread slots 901a and 901b. Therefore, software entities, such as an operating system, in one embodiment potentially view processor 900 as four separate processors, i.e., four logical processors or processing elements capable of executing four software threads concurrently. As alluded to above, a first thread is associated with architecture state registers 901a, a second thread is associated with architecture state registers 901b, a third thread may be associated with architecture state registers 902a, and a fourth thread may be associated with architecture state registers 902b. Here, each of the architecture state registers (901a, 901b, 902a, and 902b) may be referred to as processing elements, thread slots, or thread units, as described above. As illustrated, architecture state registers 901a are replicated in architecture state registers 901b, so individual architecture states/contexts are capable of being stored for logical processor 901a and logical processor 901b. In core 901, other smaller resources, such as instruction pointers and renaming logic in allocator and renamer block 930 may also be replicated for threads 901a and 901b. Some resources, such as re-order buffers in reorder/retirement unit 935, ILTB 920, load/store buffers, and queues may be shared through partitioning. Other resources, such as general purpose internal registers, page-table base register(s), low-level data-cache and data-TLB 915, execution unit(s) 940, and portions of out-of-order unit 935 are potentially fully shared.

Processor 900 often includes other resources, which may be fully shared, shared through partitioning, or dedicated by/to processing elements. In FIG. 9, an embodiment of a purely exemplary processor with illustrative logical units/resources of a processor is illustrated. Note that a processor may include, or omit, any of these functional units, as well as include any other known functional units, logic, or firmware not depicted. As illustrated, core 901 includes a simplified, representative out-of-order (OOO) processor core. But an in-order processor may be utilized in different embodiments. The OOO core includes a branch target buffer 920 to predict branches to be executed/taken and an instruction-translation buffer (I-TLB) 920 to store address translation entries for instructions.

Core 901 further includes decode module 925 coupled to fetch unit 920 to decode fetched elements. Fetch logic, in one embodiment, includes individual sequencers associated with thread slots 901a, 901b, respectively. Usually core 901 is associated with a first ISA, which defines/specifies instructions executable on processor 900. Often machine code instructions that are part of the first ISA include a portion of the instruction (referred to as an opcode), which references/specifies an instruction or operation to be performed. Decode logic 925 includes circuitry that recognizes these instructions from their opcodes and passes the decoded instructions on in the pipeline for processing as defined by the first ISA. For example, as discussed in more detail below decoders 925, in one embodiment, include logic designed or adapted to recognize specific instructions, such as transactional instruction. As a result of the recognition by decoders 925, the architecture or core 901 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 926, in one embodiment, recognize the same ISA (or a subset thereof). Alternatively, in a heterogeneous core environment, decoders 926 recognize a second ISA (either a subset of the first ISA or a distinct ISA).

In one example, allocator and renamer block 930 includes an allocator to reserve resources, such as register files to store instruction processing results. However, threads 901a and 901b are potentially capable of out-of-order execution, where allocator and renamer block 930 also reserves other resources, such as reorder buffers to track instruction results. Unit 930 may also include a register renamer to rename program/instruction reference registers to other registers internal to processor 900. Reorder/retirement unit 935 includes components, such as the reorder buffers mentioned above, load buffers, and store buffers, to support out-of-order execution and later in-order retirement of instructions executed out-of-order.

Scheduler and execution unit(s) block 940, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 950 are coupled to execution unit(s) 940. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 901 and 902 share access to higher-level or further-out cache, such as a second level cache associated with on-chip interface 910. Note that higher-level or further-out refers to cache levels increasing or getting further way from the execution unit(s). In one embodiment, higher-level cache is a last-level data cache—last cache in the memory hierarchy on processor 900—such as a second or third level data cache. However, higher level cache is not so limited, as it may be associated with or include an instruction cache. A trace cache—a type of instruction cache—instead may be coupled after decoder 925 to store recently decoded traces. Here, an instruction potentially refers to a macro-instruction (i.e. a general instruction recognized by the decoders), which may decode into a number of micro-instructions (micro-operations).

In the depicted configuration, processor 900 also includes on-chip interface module 910. Historically, a memory controller, which is described in more detail below, has been included in a computing system external to processor 900. In this scenario, on-chip interface 910 is to communicate with devices external to processor 900, such as system memory 975, a chipset (often including a memory controller hub to connect to memory 975 and an I/O controller hub to connect peripheral devices), a memory controller hub, a northbridge, or other integrated circuit. And in this scenario, bus 905 may include any known interconnect, such as multi-drop bus, a point-to-point interconnect, a serial interconnect, a parallel bus, a coherent (e.g. cache coherent) bus, a layered protocol architecture, a differential bus, and a GTL bus. In one implementation, SMCs 104, 154 described with respect to FIG. 1 and/or SMCs 202, 204 described with respect to FIG. 2 may be implemented as on-chip interface 910.

Memory 975 may be dedicated to processor 900 or shared with other devices in a system. Common examples of types of memory 975 include DRAM, SRAM, non-volatile memory (NV memory), and other known storage devices. Note that device 980 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 900. For example in one embodiment, a memory controller hub is on the same package and/or die with processor 900. Here, a portion of the core (an on-core portion) 910 includes one or more controller(s) for interfacing with other devices such as memory 975 or a graphics device 980. The configuration including an interconnect and controllers for interfacing with such devices is often referred to as an on-core (or un-core configuration). As an example, on-chip interface 910 includes a ring interconnect for on-chip communication and a high-speed serial point-to-point link 905 for off-chip communication. Yet, in the SOC environment, even more devices, such as the network interface, co-processors, memory 975, graphics processor 980, and any other known computer devices/interface may be integrated on a single die or integrated circuit to provide small form factor with high functionality and low power consumption.

In one embodiment, processor 900 is capable of executing a compiler, optimization, and/or translator code 977 to compile, translate, and/or optimize application code 976 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

The following examples pertain to further embodiments. Example 1 is a source shared memory controller (SMC) for implementing virtual machine migration in rack scale systems. Further to Example 1, the source SMC comprising: a direct memory access (DMA) move engine to: establish a first virtual channel (VC) over a link with a destination SMC, the destination SMC coupled to a destination node hosting a virtual machine (VM), wherein the VM is migrated to the destination node from a source node coupled to the source SMC, and wherein the link is to support memory semantics and an input/output (I/O) protocol; and transmit, via the first VC to the destination SMC, units of data corresponding to the VM and directory state metadata associated with each unit of data; and a demand request component to: establish a second VC over the link with the destination SMC, the second VC separate from the first VC; receive, via the second VC from the destination SMC, a demand request for one of the units of data corresponding to the VM; and transmit, via the second VC to the destination SMC, the requested unit of data and corresponding directory state metadata for the requested unit of data.

In Example 2, the subject matter of Example 1 can optionally include wherein the link uses at least one of a common set of pins or a networking stack. In Example 3, the subject matter of any one of Examples 1-2 can optionally include wherein the DMA move engine is further to, for each unit of data that is transferred via the first VC, mark a directory state bit encoding corresponding to the unit of data at the source SMC as invalid. In Example 4, the subject matter of any one of Examples 1-3 can optionally include wherein the demand request component is further to, subsequent to transmitting the requested unit of data via the second VC, update a directory state bit encoding corresponding to each of the requested units of data at the source SMC as transferred.

In Example 5, the subject matter of any one of Examples 1-4 can optionally include wherein the demand request component to receive the demand request and transmit the requested unit of data while the DMA move engine transmits the units of data. In Example 6, the subject matter of any one of Examples 1-5 can optionally include wherein the directory state metadata corresponds to directory state bit encodings maintained with the units of data, the directory state bit encodings comprising an invalid state, a shared state, an exclusive state, and a transferred state. In Example 7, the subject matter of any one of Examples 1-6 can optionally include wherein each unit of data comprises a cache line corresponding to memory of the VM.

In Example 8, the subject matter of any one of Examples 1-7 can optionally include wherein the source SMC manages memory access to pooled memory that is shared by the source node and other nodes in a multi-node system. In Example 9, the subject matter of any one of Examples 1-8 can optionally include wherein the demand request is received at the source SMC responsive to the destination SMC determining that the requested unit of data has not yet been transferred to the destination SMC from the source SMC via the first VC. All optional features of the apparatus described above may also be implemented with respect to the method or process described herein.

Example 10 is a destination SMC comprising a direct memory access (DMA) move engine to: establish a first virtual channel (VC) over a link with a source SMC coupled to a source node that hosted a virtual machine (VM) that migrated to a second node coupled to the destination SMC, the link to support both memory semantics and an input/output (I/O) protocol; request, via the first VC, units of data corresponding to the VM from the source SMC; and receive, via the first VC from the source SMC, the units of data and directory state metadata associated with each received unit of data. The destination SMC further includes a demand request component to: establish a second VC over the link with the source SMC, the second VC separate from the first VC; receive a demand request for one of the units of data corresponding to the VM; determine that the requested unit of data has not been transferred to the destination SMC; transmit, via the second VC, the demand request to the source SMC; and receive, via the second VC from the source SMC, the requested unit of data and corresponding directory state metadata for the requested unit of data.

In Example 11, the subject matter of Example 10 can optionally include wherein the link uses at least one of a common set of pins or a networking stack. In Example 12, the subject matter of any one of Examples 10-11 can optionally include wherein the DMA move engine is further to, for each unit of data that is received via the first VC, mark a directory state bit encoding corresponding to the unit of data at the destination SMC as invalid.

In Example 13, the subject matter of any one of Examples 10-12 can optionally include wherein the demand request component is further to, subsequent to receiving the requested unit of data via the second VC, update a directory state bit encoding corresponding to the requested unit of data according to the received directory state metadata. In Example 14, the subject matter of any one of Examples 10-13 can optionally include wherein the demand request component to receive the demand request, transmit the demand request, and receive the requested unit of data while the DMA move engine receives the units of data.

In Example 15, the subject matter of any one of Examples 10-14 can optionally include wherein the directory state metadata corresponds to directory state bit encodings maintained with the units of data, the directory state bit encodings comprising an invalid state, a shared state, an exclusive state, and a transferred state. In Example 16, the subject matter of any one of Examples 10-15 can optionally include wherein each unit of data comprises a cache line corresponding to memory of the VM. In Example 17, the subject matter of any one of Examples 10-16 can optionally include wherein the destination SMC manages memory access to pooled memory that is shared by the destination node and other nodes in a multi-node system.

Example 18 is a method for virtual machine migration in rack scale systems comprising establishing, by a destination shared memory controller (SMC), a first virtual channel (VC) over a link with a source SMC, the source SMC coupled to a source node that hosted a virtual machine (VM) that migrated to a destination node coupled to the destination SMC, and wherein the link to support both memory semantics and an input/output (I/O) protocol; receiving, via the first VC from the source SMC, units of data corresponding to the VM and directory state metadata associated with each unit of data; establishing, by the destination SMC, a second VC over the link with the source SMC, the second VC separate from the first VC; receiving, by the destination SMC, a demand request for one of the units of data corresponding to the VM; determining, by the destination SMC, that the unit of data has not been transferred to the destination SMC; responsive to determining that the unit of data has not be transferred, forwarding, via the second VC, the demand request to the source SMC; and receiving, via the second VC from the source SMC, a response to the demand request, the response comprising the requested unit of data and corresponding directory state metadata for the requested unit of data.

In Example 19, the subject matter of Example 18 can optionally include wherein the link uses at least one of a common set of pins or a networking stack. In Example 20, the subject matter of any one of Examples 18-19 can optionally include further comprising, for each unit of data that is received via the first VC, marking a directory state bit encoding corresponding to the unit of data at the destination SMC as invalid.

In Example 21, the subject matter of any one of Examples 18-20 can optionally include further comprising, subsequent to receiving the response to the demand request via the second VC, updating a directory state bit encoding corresponding to the requested unit of data according to the received directory state metadata. In Example 22, the subject matter of any one of Examples 18-21 can optionally include wherein the receiving the demand request, forwarding the demand request, and the receiving the response to the demand request are performed concurrent with receiving the units of data.

In Example 23, the subject matter of any one of Examples 18-22 can optionally include wherein the directory state metadata corresponds to directory state bit encodings maintained with the units of data, the directory state bit encodings comprising an invalid state, a shared state, an exclusive state, and a transferred state. In Example 24, the subject matter of any one of Examples 18-23 can optionally include wherein each unit of data comprises a cache line corresponding to memory of the VM. In Example 25, the subject matter of any one of Examples 18-24 can optionally include wherein the destination SMC manages memory access to pooled memory that is shared by the destination node and other nodes in a multi-node system.

Example 26 is a method for virtual machine migration in rack scale systems comprising establishing, by a source shared memory controller (SMC), a first virtual channel (VC) over a link with a destination SMC, the destination SMC coupled to a destination node hosting a virtual machine (VM), wherein the VM is migrated to the destination node from a source node coupled to the source SMC, and wherein the link to support both memory semantics and an input/output (I/O) protocol; receiving, by the source SMC via the first VC to the source SMC, a request for units of data corresponding to the VM and directory state metadata associated with each unit of data; responsive to the request for the units of data, sending, by the source SMC via the first VC, the units of data and the directory state metadata associated with each unit of data; establishing, by the source SMC, a second VC over the link with the destination SMC, the second VC separate from the first VC; receiving, by the source SMC, a demand request for one of the units of data corresponding to the VM from the destination SMC; and transmitting, via the second VC, the requested unit of data and corresponding directory state metadata for the requested unit of data to the destination SMC.

In Example 27, the subject matter of Example 26 can optionally include, for each unit of data that is sent via the first VC, marking a directory state bit encoding corresponding to the unit of data at the source SMC as invalid. In Example 28, the subject matter of any one of Examples 26-27 can optionally include further comprising, subsequent to receiving the requested unit of data via the second VC, updating a directory state bit encoding corresponding to each of the requested units of data at the source SMC as transferred. In Example 29, the subject matter of any one of Examples 26-28 can optionally include wherein the receiving the demand request and the transmitting the requested unit of data are performed while the units of data are sent.

Example 30 is a system for implementing virtual machine migration. In Example 30, the system includes a pooled memory and a direct memory access (DMA) move engine communicably coupled to the pooled memory. Further to Example 30, the DMA move engine is to establish a first virtual channel (VC) over a link with a source SMC coupled to a source node that hosted a virtual machine (VM) that migrated to a second node coupled to the destination SMC, the link to support both memory semantics and an input/output (I/O) protocol; request, via the first VC, units of data corresponding to the VM from the source SMC; receive, via the first VC from the source SMC, the units of data and directory state metadata associated with each received unit of data; store the received units of data to the pooled memory. The system further includes a demand request component communicably coupled to the pooled memory, the demand request component to: establish a second VC over the link with the source SMC, the second VC separate from the first VC; receive a demand request for one of the units of data corresponding to the VM; determine that the requested unit of data has not been transferred to the destination SMC; transmit, via the second VC, the demand request to the source SMC; receive, via the second VC from the source SMC, the requested unit of data and corresponding directory state metadata for the requested unit of data; and store the received requested unit of data to the pooled memory.

In Example 31, the subject matter of Example 30 can optionally include wherein the DMA move engine is further to, for each unit of data that is received via the first VC, mark a directory state bit encoding corresponding to the unit of data at the destination SMC as invalid. In Example 32 the subject matter of any one of Examples 30-31 can optionally include wherein the demand request component is further to, subsequent to receiving the requested unit of data via the second VC, update a directory state bit encoding corresponding to the requested unit of data according to the received directory state metadata. In Example 33 the subject matter of any one of Examples 30-32 can optionally include wherein the demand request component to receive the demand request, transmit the demand request, and receive the requested unit of data while the DMA move engine receives the units of data. In Example 34 the subject matter of any one of Examples 30-33 can optionally include, wherein the directory state metadata corresponds to directory state bit encodings maintained with the units of data, the directory state bit encodings comprising an invalid state, a shared state, an exclusive state, and a transferred state.

In Example 35 the subject matter of any one of Examples 30-34 can optionally include wherein each unit of data comprises a cache line corresponding to memory of the VM. In Example 36 the subject matter of any one of Examples 30-35 can optionally include wherein the destination SMC manages memory access to pooled memory that is shared by the destination node and other nodes in a multi-node system.

Example 37 is a non-transitory computer-readable medium for implementing virtual machine migration in rack scale systems. In Example 37, the non-transitory machine-readable medium includes data that, when accessed by a processing device, cause the processing device to perform operations comprising establishing, by a source shared memory controller (SMC), a first virtual channel (VC) over a link with a destination SMC, the destination SMC coupled to a destination node hosting a virtual machine (VM), wherein the VM is migrated to the destination node from a source node coupled to the source SMC, and wherein the link to support both memory semantics and an input/output (I/O) protocol; receiving, by the source SMC via the first VC to the source SMC, a request for units of data corresponding to the VM and directory state metadata associated with each unit of data; responsive to the request for the units of data, sending, by the source SMC via the first VC, the units of data and the directory state metadata associated with each unit of data; establishing, by the source SMC, a second VC over the link with the destination SMC, the second VC separate from the first VC; receiving, by the source SMC, a demand request for one of the units of data corresponding to the VM from the destination SMC; and transmitting, via the second VC, the requested unit of data and corresponding directory state metadata for the requested unit of data to the destination SMC.

In Example 38, the subject matter of Example 37 can optionally include wherein the operations further comprise, for each unit of data that is sent via the first VC, marking a directory state bit encoding corresponding to the unit of data at the source SMC as invalid. In Example 39, the subject matter of Examples 37-38 can optionally include wherein the operations further comprise, subsequent to receiving the requested unit of data via the second VC, updating a directory state bit encoding corresponding to each of the requested units of data at the source SMC as transferred.

In Example 40, the subject matter of Examples 37-39 can optionally include wherein the receiving the demand request and the transmitting the requested unit of data are performed while the units of data are sent. In Example 41, the subject matter of Examples 37-40 can optionally include wherein the BPU selects a thread having a lowest value of its corresponding time-out down counter to receive an execution context switch of the processing device.

Example 42 is an apparatus for implementing virtual machine migration in rack scale systems comprising means for establishing a first virtual channel (VC) over a link with a source SMC, the source shared memory controller (SMC) coupled to a source node that hosted a virtual machine (VM) that migrated to a second node coupled to a destination SMC, and wherein the link to support both memory semantics and an input/output (I/O) protocol; means for receiving, via the first VC from the source SMC, units of data corresponding to the VM and directory state metadata associated with each unit of data; means for establishing a second VC over the link with the source SMC, the second VC separate from the first VC; means for receiving a demand request for one of the units of data corresponding to the VM; means for determining that the unit of data has not been transferred to the destination SMC; means for forwarding, responsive to determining that the unit of data has not be transferred, the demand request to the source SMC via the second VC; and means for receiving, via the second VC from the source SMC, a response to the demand request, the response comprising the requested unit of data and corresponding directory state metadata for the requested unit of data.

In Example 44, the subject matter of Example 43 can optionally include the apparatus further configured to perform the method of any one of the Examples 19 to 25.

Example 45 is at least one machine readable medium comprising a plurality of instructions that in response to being executed on a computing device, cause the computing device to carry out a method according to any one of Examples 18-25. Example 43 is an apparatus for virtual machine migration in rack scale systems configured to perform the method of any one of Examples 18-25. Example 44 is an apparatus for implementing virtual machine migration in rack scale systems comprising means for performing the method of any one of claims 18 to 25. Specifics in the Examples may be used anywhere in one or more embodiments Various embodiments can have different combinations of the structural features described above. For instance, all optional features of the methods described above can also be implemented for various usages in SOC applications and can be implemented with respect to an interface described herein and specifics in the examples can be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation, etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments may be described with reference to timestamp validation of components in solid-state memory devices in specific integrated circuits, such as in computing platforms or microprocessors. The embodiments can also be applicable to other types of integrated circuits and programmable logic devices. For example, the disclosed embodiments are not limited to desktop computer systems or portable computers, such as the Intel® Ultrabooks™ computers, and can be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments can especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but can also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure can be provided as a computer program product or software which can include a machine or computer-readable medium having stored thereon instructions which can be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design can go through various stages, from creation to simulation to fabrication. Data representing a design can represent the design in a number of manners. First, as is useful in simulations, the hardware can be represented using a hardware description language or another functional description language. Additionally, a circuit level model with logic and/or transistor gates can be produced at some stages of the design process. Furthermore, most designs, at some stage, reach a level of data representing the physical placement of various devices in the hardware model. In the case where conventional semiconductor fabrication techniques are used, the data representing the hardware model can be the data specifying the presence or absence of various features on different mask layers for masks used to produce the integrated circuit. In any representation of the design, the data can be stored in any form of a machine readable medium. A memory or a magnetic or optical storage such as a disc can be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider can store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) can refer to the combination of the microcontroller and the non-transitory medium. Often module boundaries that are illustrated as separate commonly vary and potentially overlap. For example, a first and a second module can share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate can provide a 0 or a 1 during operation. But a logic gate 'configured to' provide an enable signal to a clock does not include every potential logic gate that can provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, can be capable of holding a single logical value or multiple logical values. However, other representations of values in computer systems have been used. For example the decimal number ten can also be represented as a binary value of 1010 and a hexadecimal letter A. Therefore, a value includes any representation of information capable of being held in a computer system.

Moreover, states can be represented by values or portions of values. As an example, a first value, such as a logical one, can represent a default or initial state, while a second value, such as a logical zero, can represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values can be utilized to represent any number of states.

The embodiments of methods, hardware, software, firmware or code set forth above can be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that can receive information there from.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics can be combined in any suitable manner in one or more embodiments.

In the foregoing specification, a detailed description has been given with reference to specific exemplary embodiments. It will, however, be evident that various modifications and changes can be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but can refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "determining," "issuing," "linking," "associating," "obtaining," "authenticating," "prohibiting," "executing," "requesting," "communicating," "setting," "receiving," "generating," "transmitting," "changing," "putting," "detecting," "self-resetting," "resetting," "establishing," "performing," "outputting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and can not necessarily have an ordinal meaning according to their numerical designation.

What is claimed is:

1. A source shared memory controller (SMC) comprising:
a direct memory access (DMA) move engine to:
establish a first virtual channel (VC) over a link with a destination SMC, the destination SMC coupled to a destination node hosting a virtual machine (VM), wherein the VM is migrated to the destination node from a source node coupled to the source SMC, and wherein the link is to support memory semantics and an input/output (I/O) protocol; and
transmit, via the first VC to the destination SMC, units of data corresponding to the VM and directory state metadata associated with each unit of data; and
a demand request component to:
establish a second VC over the link with the destination SMC, the second VC separate from the first VC;
receive, via the second VC from the destination SMC, a demand request for one of the units of data corresponding to the VM; and
transmit, via the second VC to the destination SMC, the requested unit of data and corresponding directory state metadata for the requested unit of data.

2. The source SMC of claim 1, wherein the link uses at least one of a common set of pins or a networking stack.

3. The source SMC of claim 1, wherein the DMA move engine is further to, for each unit of data that is transferred via the first VC, mark a directory state bit encoding corresponding to the unit of data at the source SMC as invalid.

4. The source SMC of claim 1, wherein the demand request component is further to, subsequent to transmitting the requested unit of data via the second VC, update a directory state bit encoding corresponding to each of the requested units of data at the source SMC as transferred.

5. The source SMC of claim 1, wherein the demand request component to receive the demand request and transmit the requested unit of data while the DMA move engine transmits the units of data.

6. The source SMC of claim 1, wherein the directory state metadata corresponds to directory state bit encodings maintained with the units of data, the directory state bit encodings comprising an invalid state, a shared state, an exclusive state, and a transferred state.

7. The source SMC of claim 1, wherein each unit of data comprises a cache line corresponding to memory of the VM.

8. The source SMC of claim 1, wherein the source SMC manages memory access to pooled memory that is shared by the source node and other nodes in a multi-node system.

9. The source SMC of claim 1, wherein the demand request is received at the source SMC responsive to the destination SMC determining that the requested unit of data has not yet been transferred to the destination SMC from the source SMC via the first VC.

10. A destination shared memory controller (SMC), comprising:
a direct memory access (DMA) move engine to:
establish a first virtual channel (VC) over a link with a source SMC coupled to a source node that hosted a virtual machine (VM) that migrated to a second node coupled to the destination SMC, the link to support both memory semantics and an input/output (I/O) protocol;
request, via the first VC, units of data corresponding to the VM from the source SMC; and
receive, via the first VC from the source SMC, the units of data and directory state metadata associated with each received unit of data;
a demand request component to:
establish a second VC over the link with the source SMC, the second VC separate from the first VC;
receive a demand request for one of the units of data corresponding to the VM;
determine that the requested unit of data has not been transferred to the destination SMC;
transmit, via the second VC, the demand request to the source SMC; and
receive, via the second VC from the source SMC, the requested unit of data and corresponding directory state metadata for the requested unit of data.

11. The destination SMC of claim 10, wherein the link uses at least one of a common set of pins or a networking stack.

12. The destination SMC of claim 10, wherein the DMA move engine is further to, for each unit of data that is received via the first VC, mark a directory state bit encoding corresponding to the unit of data at the destination SMC as invalid.

13. The destination SMC of claim 10, wherein the demand request component is further to, subsequent to receiving the requested unit of data via the second VC, update a directory state bit encoding corresponding to the requested unit of data according to the received directory state metadata.

14. The destination SMC of claim 10, wherein the demand request component to receive the demand request, transmit the demand request, and receive the requested unit of data while the DMA move engine receives the units of data.

15. The destination SMC of claim 10, wherein the directory state metadata corresponds to directory state bit encodings maintained with the units of data, the directory state bit encodings comprising an invalid state, a shared state, an exclusive state, and a transferred state.

16. The destination SMC of claim 10, wherein each unit of data comprises a cache line corresponding to memory of the VM.

17. The destination SMC of claim 10, wherein the destination SMC manages memory access to pooled memory that is shared by the destination node and other nodes in a multi-node system.

18. A method comprising:
    establishing, by a destination shared memory controller (SMC), a first virtual channel (VC) over a link with a source SMC, the source SMC coupled to a source node that hosted a virtual machine (VM) that migrated to a destination node coupled to the destination SMC, and wherein the link to support both memory semantics and an input/output (I/O) protocol;
    receiving, via the first VC from the source SMC, units of data corresponding to the VM and directory state metadata associated with each unit of data;
    establishing, by the destination SMC, a second VC over the link with the source SMC, the second VC separate from the first VC;
    receiving, by the destination SMC, a demand request for one of the units of data corresponding to the VM;
    determining, by the destination SMC, that the unit of data has not been transferred to the destination SMC;
    responsive to determining that the unit of data has not be transferred, forwarding, via the second VC, the demand request to the source SMC; and
    receiving, via the second VC from the source SMC, a response to the demand request, the response comprising the requested unit of data and corresponding directory state metadata for the requested unit of data.

19. The method of claim 18, further comprising, for each unit of data that is received via the first VC, marking a directory state bit encoding corresponding to the unit of data at the destination SMC as invalid.

20. The method of claim 18, further comprising, subsequent to receiving the response to the demand request via the second VC, updating a directory state bit encoding corresponding to the requested unit of data according to the received directory state metadata.

21. The method of claim 18, wherein the receiving the demand request, forwarding the demand request, and the receiving the response to the demand request are performed concurrent with receiving the units of data.

22. A method comprising:
    establishing, by a source shared memory controller (SMC), a first virtual channel (VC) over a link with a destination SMC, the destination SMC coupled to a destination node hosting a virtual machine (VM), wherein the VM is migrated to the destination node from a source node coupled to the source SMC, and wherein the link to support both memory semantics and an input/output (I/O) protocol;
    receiving, by the source SMC via the first VC to the source SMC, a request for units of data corresponding to the VM and directory state metadata associated with each unit of data;
    responsive to the request for the units of data, sending, by the source SMC via the first VC, the units of data and the directory state metadata associated with each unit of data;
    establishing, by the source SMC, a second VC over the link with the destination SMC, the second VC separate from the first VC;
    receiving, by the source SMC, a demand request for one of the units of data corresponding to the VM from the destination SMC; and
    transmitting, via the second VC, the requested unit of data and corresponding directory state metadata for the requested unit of data to the destination SMC.

23. The method of claim 22, further comprising, for each unit of data that is sent via the first VC, marking a directory state bit encoding corresponding to the unit of data at the source SMC as invalid.

24. The method of claim 22, further comprising, subsequent to receiving the requested unit of data via the second VC, updating a directory state bit encoding corresponding to each of the requested units of data at the source SMC as transferred.

25. The method of claim 22, wherein the receiving the demand request and the transmitting the requested unit of data are performed while the units of data are sent.

* * * * *